(12) United States Patent
Sternini

(10) Patent No.: US 9,193,636 B2
(45) Date of Patent: Nov. 24, 2015

(54) AGRICULTURAL COMPOSITION

(76) Inventor: Daniela Sternini, Frankfurt (DE)

( * ) Notice: Subject to any disclaimer, the term of this patent is extended or adjusted under 35 U.S.C. 154(b) by 0 days.

(21) Appl. No.: 13/203,931

(22) PCT Filed: Feb. 19, 2010

(86) PCT No.: PCT/EP2010/052104
§ 371 (c)(1),
(2), (4) Date: Sep. 14, 2011

(87) PCT Pub. No.: WO2010/100040
PCT Pub. Date: Sep. 10, 2010

(65) Prior Publication Data
US 2011/0319501 A1 Dec. 29, 2011

(30) Foreign Application Priority Data
Mar. 4, 2009 (EP) ..................... 09425084

(51) Int. Cl.
*A01N 25/00* (2006.01)
*C05G 3/04* (2006.01)
*C05G 3/00* (2006.01)

(52) U.S. Cl.
CPC ............. *C05G 3/04* (2013.01); *C05G 3/0047* (2013.01)

(58) Field of Classification Search
CPC ............................ C05G 3/04; C05G 3/0047
See application file for complete search history.

(56) References Cited

U.S. PATENT DOCUMENTS

| | | | | |
|---|---|---|---|---|
| 2,877,599 | A * | 3/1959 | Hebestreet et al. | 47/9 |
| 3,909,228 | A * | 9/1975 | Nakashima et al. | 71/1 |
| 4,123,489 | A * | 10/1978 | Kelley | 264/141 |
| 5,653,053 | A * | 8/1997 | Handley | 47/1.01 R |
| 6,855,182 | B2 | 2/2005 | Sears | |
| 2002/0039869 | A1 * | 4/2002 | Achille | 442/417 |
| 2004/0011102 | A1 * | 1/2004 | Sears | 71/25 |
| 2009/0163365 | A1 | 6/2009 | Bentlage et al. | |

FOREIGN PATENT DOCUMENTS

| | | |
|---|---|---|
| DE | 9405556 U1 | 6/1994 |
| DE | 295 17 526 U1 | 12/1995 |
| DE | 29517526 U1 | 12/1995 |
| DE | 10 2005 021 221 A1 | 11/2006 |
| DE | 102005021221 A1 | 11/2006 |
| EP | 1 145 621 A1 | 10/2001 |
| EP | 1145621 A1 | 10/2001 |
| GB | 2 245 555 A | 1/1992 |
| GB | 224555 A | 1/1992 |
| WO | 91/03940 | 4/1991 |
| WO | WO9103940 | 4/1991 |
| WO | WO 92/19095 | 11/1992 |
| WO | WO9219095 A1 | 11/1992 |
| WO | WO 2009/092127 | 7/2009 |
| WO | WO2009092127 A1 | 7/2009 |

OTHER PUBLICATIONS

Susan Bailey, et al, A Review of Potentially Low-Cost Sorbents for Heavy Metals, 33 WAT. RES. 2469 (1999).*
Kahl Pelleting Presses.*
International Search Report from PCT/EP2010/052104 dated Jun. 4, 2010.
Susan E. Bailey et al., "A Review of Potentially Low-Cost Sorbents for Heavy Metals" Wat. REs. vol. 33, No. 11, pp. 2469-2479 1999.

* cited by examiner

*Primary Examiner* — Sean Basquill
(74) *Attorney, Agent, or Firm* — Lucas & Mercanti, LLP

(57) ABSTRACT

Additives for compost for ornamental plants and/or agricultural production plants in the form of granules comprising a) between 5 and 65% by weight on the total weight of the composition of a superabsorbent polymer, for agriculture (SAP), b) between 35 and 70% by weight on the total weight of the composition of a hygroscopic material essentially of vegetable origin; c) between 20 and 40% by weight on the total weight of the composition of a natural plasticizer of mineral or vegetable origin.

10 Claims, No Drawings

AGRICULTURAL COMPOSITION

FIELD OF THE INVENTION

The present invention regards an additive for compost for ornamental plants and agricultural production plants.

STATE OF THE ART

Modern agriculture consumes almost ⅔ of the world water demand. For this reason, systems capable of storing and using water when strictly necessary, thus avoiding wastage thereof, are more and more necessary.

DE29517526 U1 describes an additive only for ornamental plants containing cellulose or lignin fibres, swelling polymers and clay.

However this additive results to be a heterogeneous physical mixture of two different types of solid materials: the polymer in powder form and the lignin in fibres form. In addition the polymer used is able to absorb water in amounts up to 10 times its initial weight.

Consequently this additive is decidedly not applicable in agricultural production plants especially in extended arid zones, which require high amounts of water.

By the way polymers are already known capable of storing decidedly high amounts of water and subsequently releasing it gradually.

These polymers belong for example the superabsorbent polymers the so-called SAP, and are for example the salified acrylic acid/acrylamide cross-linked copolymers.

These polymers, generally made up of a series of polymer chains arranged parallel to each other and linked to each other by a cross-linking agent, have a network structure. When water comes into contact with one of these chains it is incorporated in the molecule by osmosis and spreads rapidly inside the polymer network where it is stored. Such polymers can store water up to 200 times the weight of the polymer.

Once the soil on which the polymer is deposited dries, the polymer releases up to 95% of water of the stored water.

Though these polymers represent a solution to the abovementioned problems, their application in the agricultural industry is not as common as one may expect.

As a matter of fact, it should be firstly considered that the water absorption thereof proportionally increases with the reduction of the size of the relative particles, such size should be smaller than 3 mm and preferably comprised between 0.3 and 0.5 mm.

The application of this material in form of a very fine powder turns out to be extremely difficult on any type of soil both in green houses and outdoors, in addition to the fact that the product is white, a colour rarely appealing to farmers.

Thus, there was the need to overcome the abovementioned drawbacks and hence find an additive for compost for ornamental plants and for agricultural production capable of carrying such polymer.

US2004/0011102 solves the above problem with a soil conditioning composite comprising a pelletized matrix of lignocellulose and a soil conditioning material interdispersed within said matrix in amounts of from 0.1% to 20% by weight of the composite.

The soil conditioning material comprises as essential component a SAP polymer and optionally other components such as gypsum, calcium salts and fertilizers.

The disadvantage of this type of material is that the preparation thereof encompasses starting material lignin fibres already in pellets form, with the consequence that for binding the SAP polymer and the other additive to said vegetable fibres it is necessary to carry out a granulation process in the presence of high amounts of water (30-40% by weight based on the total composition weight, water which in the end of the process must be removed by a thorough drying step, to detriment of the economy of the process itself.

In addition in this granulation process requires the presence of strong binders which are organic polymers such as polyvinyl alcohol polyvinylpyrrolidone, whose use thereof should be prevented or at least limited, especially when the product is used in extensive agricultural production plants.

SUMMARY OF THE INVENTION

The Applicant has now found that it is possible to overcome the abovementioned drawbacks with an additive for compost for ornamental plants and/or agricultural production plants, in the form of granules comprising as essential components:

a) between 5 and 65% by weight on the total weight of the composition of a superabsorbent polymer (SAP) for agriculture b) between 35 and 70% by weight on the total weight of the composition of a hygroscopic material essentially of vegetable origin, c) between 20 and 40% by weight on the total weight of the composition of a natural plasticizer of mineral or vegetable origin.

In fact the granules according to the present invention are in fact prepared with two different type of processes of which the first one is carried out in the absence of water whereas the second one is carried out in amounts of water not exceeding 20%.

In addition the granules according to the present invention do not contain further synthetic polymeric material besides the SAP.

DETAILED DESCRIPTION OF THE INVENTION

For the purposes of the present invention the term "ornamental plants" is used to indicate all types of ornamental plants including trees, while the term "agricultural production plants" is used to indicate cereal plants, fruit plants and trees, garden plants etc.

For the purposes of the present invention with the definition comprising as essential components the Applicant means that the components subsequently listed (a)-(c) are the sole necessary to obtain the required granules compactness and water absorption features, rendering them particularly suitable for the intended use.

The above wording therefore excludes the presence of further synthetic polymeric material such as polyvinylalcohols and polyvinylpyrrolidone.

For the purposes of the present invention the term "granule form" is used to indicate a product in form of granulate or pellets, preferably cylindrically shaped.

For the purposes of the present invention, the term "superabsorbent polymer SAP for agriculture" used as component (a) in the compositions object of the present invention is used to indicate a polymer capable of absorbing water of at least 100 but preferably up to 150-200 times the initial weight and capable of gradually releasing up to 95% of the adsorbed water.

These polymers are generally formed by cross-linked polyacrylic acid in salified form and they can possibly contain acrylamide repeating units therein.

Preferably, these polymers are salified with alkali metals and even more preferably the latter are selected from among sodium and potassium.

Preferably, SAP polymers available in the market under the commercial names STOCKOSORB™, AQUASORB™, LUQUASORB™, etc are used for the objects of the present invention.

The component (b) i.e. the hygroscopic material is in particular a cellulosic material such as for example cereal fibres and more preferably bran, corn cob, but also and more preferably peat, rice husk, and according to a particularly preferred solution it is formed by a peat and rice husk mixture.

The plasticizer of vegetable origin or component (c) of the composition subject of the present invention is preferably selected from among starch, flour, corn cob while the plasticizer of mineral origin is selected from bentonite, zeolite, rock flour in micronised form. According to a particularly preferred solution it is bentonite.

The composition of the present invention may also contain fertilisers and/or pesticides, and other additives usually employed in the agricultural industry and/or for ornamental plants.

The composition of the present invention may contain an amount of water not exceeding 20%-30%.

A particularly preferred additive according to the present invention comprises: between 20 and 30% of component (a), between 40 and 60% of component (b) and between 20 and 30% of component (c).

Further object of the present invention are methods for preparing the above mentioned granules.

The first process comprises the following steps:
I) mixing components (a), (b) and (c), and
II) passing the mixture obtained in the previous step on a machine for pelletizing animal foodstuffs comprising a pressing group consisting of one or more rollers that compress the abovementioned mixture and a die supply line from which the product exits in form of pellets.

A second process for preparing said additives instead comprises the following stages:
A) Mixing the components (a), (b) and (c) according to anyone of claims 1-9, with a water content up to 20% of water
B) Extruding the mixture obtained in the previous step,
C) Cutting the extruded product to the length suitable to obtain the granulate of the desired size.

According to a particularly preferred embodiment, the extrusion in the abovementioned process or stage (B) is preferably performed through the process described in WO2005/011956 that when specifically applied to the composition of the invention comprises the following stages:
supplying the mixture of the components (a)-(c) object with water in amounts not exceeding 20% in a first section of a screw extruder;
compressing and homogenising said composition forming a molten mixture in said first section;
compressing said mixture in a second section of a screw extruder and extruding the compressed mixture through a suitably shaped die;
the temperature of the cycle is such that the inlet temperature is 90° C.-110° C. during the first step and 90° C. at the exit of the extruder.

The granulate obtained by means of pelleting is less compact and homogeneous with respect to the one obtained by means of extrusion, hence it disintegrates more easily and thus it is capable of absorbing water faster, but also releasing it within shorter periods of time, with respect to the product coming from extrusion which is more compact, which thus takes more time to absorb water but also takes more time to release it. From such point of view the abovementioned processes allow obtaining granulate with different characteristics depending on the needs of the farming soil on which it is to be applied.

Generally the additive for compost in form of granulate is added to the soil in the order of 10-20% on the total weight of the soil to be subjected to farming.

Following are an illustrative and non-limiting example of preparation of the granulate object of the present invention obtained through pelleting or pelletisation and an example of preparation of the granulate obtained through extrusion, which is also an object of the present invention.

EXAMPLE 1

Granulate Obtained by Extruding

20% of salified polyacrylate/polyacrylamide cross-linked copolymer, 40% of bran and 40% of wheat flour previously additioned with 6% of water calculated on the total weight of the flour are mixed in a mixer to obtain a homogeneous composition, which is extruded as described in WO2005/011956 with a screw extruder provided with a first compression and homogenisation section and with a second compression section and wherein the passage between the first and the second section is controlled by a valve with a 90°-110°-90° C. temperature curve, and wherein the die has a 2-3 mm diameter.

The product exiting from the extruder is cut in such a manner that the length of the cylinder is 4-6 mm.

EXAMPLE 2

Granulate Obtained by Pelleting

20% of salified polyacrylate/polyacrylamide cross-linked copolymer, 40% of bran and 40% of starch are mixed in a mixer to obtain a homogeneous composition and subsequently introduced into a machine for pelleting animal foodstuffs comprising a pressing group usually made up of one or more rollers which compress the abovementioned composition previously mixed on a die supply line from which the product exits in form of pellets. (diameter 2-5 mm and length 4-8 mm).

EXAMPLE 3

Granulate Obtained by Pelleting

20% of salified polyacrylate/polyacrylamide cross-linked copolymer, 60% of peat and rice husk and 20% of bentonite are mixed in a mixer to obtain a homogeneous composition and subsequently introduced into a machine for pelleting animal foodstuffs comprising a pressing group usually made up of one or more rollers which compress the abovementioned composition previously mixed on a die supply line from which the product exits in form of pellets. (diameter 2-5 mm and length 4-8 mm).

The invention claimed is:
1. An additive for compost for ornamental plants or agricultural production plants wherein the additive is in the form of compact water absorbent granules comprising as essential components:
a) between 5 and 30% by weight of the total composition of a superabsorbent polymer;
b) between 35 and 60% by weight of the total composition of a hygroscopic cellulosic material essentially of veg- etable origin in which one or more is selected from the group consisting of cereal fibres, bran, corn cob, peat and rice husk;

c) between 20 and 30% by weight of the total composition of a natural plasticizer of mineral origin selected from the group consisting of bentonite, zeolite, rock flour in micronized form, or of vegetable origin selected from the group consisting of starch and flour; and d) water not exceeding 30% by weight of the total composition wherein the composition does not contain synthetic polymeric materials other than the super absorbent polymer.

2. The additive according to claim 1, wherein the superabsorbent polymer is an acrylic acid/acrylamide cross-linked copolymer, wherein the repeating units related to the acrylic acid are preferably salified with an alkali metal.

3. The additive according to claim 2, wherein said alkali metal is selected from sodium and potassium.

4. The additive according to claim 1, wherein said hygroscopic cellulosic material is one or more selected from the group consisting of peat and rice husk.

5. The additive according to claim 1, wherein said natural plasticizer is bentonite.

6. The additive according to claim 1, wherein the superabsorbent polymer ranges from 20 to 30% the hygroscopic cellulosic material ranges from 40 to 60% and the natural plasticizer ranges from 20 to 30%.

7. The additive according to claim 1, further comprising fertilisers, pesticides, and other additives usually used in the agricultural industry or for ornamental plants.

8. The additive according to claim 1, wherein the water does not exceed 20% by weight of the composition.

9. A method for preparing the additive for compost according to claim 1 comprising the steps of:

I) providing a mixture comprising:
a) between 5 and 30% by weight of the total composition of the superabsorbent polymer;
b) between 35 and 60% by weight of the total composition of the hygroscopic cellulosic material essentially of vegetable origin which is one or more selected from the group consisting of cereal fibres, bran, corn cob, peat and rice husk,
c) between 20 and 30% by weight of the total composition of the natural plasticizer of mineral origin selected from the group consisting of bentonite, zeolite, rock flour in micronized form, and/or of vegetable origin selected from the group consisting of starch and flour;

II) pelletizing the mixture obtained in step (I) on a machine for pelletizing animal foodstuffs, the machine comprising a pressing group consisting of one or more rollers that compress the abovementioned mixture on a die supply line from which the product exits in form of pellets.

10. A method for preparing the additive for compost according to claim 1 comprising the steps of:

I) providing a mixture with a water content up to 20% of water comprising:
a) between 5 and 30% by weight of the total composition of the superabsorbent polymer;
b) between 35 and 60% by weight of the total composition of the hygroscopic cellulosic material essentially of vegetable origin which is one or more selected from the group consisting of cereal fibres, bran, corn cob, peat and rice husk,
c) between 20 and 30% by weight of the total composition of the natural plasticizer of mineral origin selected from the group consisting of bentonite, zeolite, rock flour in micronized form, and/or of vegetable origin selected from the group consisting of starch and flour;

II) extruding the mixture obtained in step (I);

III) cutting the extruded product to the length suitable to obtain the granulate of the desired size.

\* \* \* \* \*